United States Patent [19]

Iwata

[11] Patent Number: 5,279,382

[45] Date of Patent: Jan. 18, 1994

[54] TRACTION CONTROL SYSTEM FOR AUTOMOTIVE VEHICLE AND TRACTION CONTROL METHOD THEREFOR

[75] Inventor: Toru Iwata, Kanagawa, Japan

[73] Assignee: Nissan Motor Co., Ltd., Yokohama, Japan

[21] Appl. No.: 961,285

[22] Filed: Oct. 15, 1992

[30] Foreign Application Priority Data

Oct. 18, 1991 [JP] Japan .................................. 3-270728
Oct. 18, 1991 [JP] Japan .................................. 3-270731
Oct. 18, 1991 [JP] Japan .................................. 3-270734

[51] Int. Cl.[5] ................................................ B60T 8/32
[52] U.S. Cl. ........................................ 180/197; 303/105; 303/113.2; 303/93; 364/426.01
[58] Field of Search ................... 303/93, 113.2, 100, 303/102, 103, 105, 106, 111; 364/426.01, 426.02, 426.03, 424.05; 180/197, 233; 188/181C, 181A, 181R; 123/333, 336, 399; 192/4R, 3.51

[56] References Cited

U.S. PATENT DOCUMENTS 4,659,150 4/1987 Kubota et al. .
4,664,452 5/1987 Kubota et al. .
5,051,905 9/1991 Yoshida .
5,169,213 12/1992 Matsuda et al. ................ 180/197 X
5,193,888 3/1993 Okazaki et al. ...................... 303/93

FOREIGN PATENT DOCUMENTS 1-301420 12/1989 Japan .

Primary Examiner—Douglas C. Butler
Attorney, Agent, or Firm—Lowe, Price, LeBlanc & Becker

[57] ABSTRACT

An improved traction control system and method for an automotive vehicle are disclosed in which both deceleration slip brake control system (ABS) and acceleration slip brake control system (TCS) are mounted and a switching condition of control from the deceleration slip brake control to the acceleration slip brake control is different from a switching condition from the acceleration slip brake control to the deceleration slip brake control, the deceleration slip brake control having a higher priority that the acceleration slip brake control so as to prevent occurrence of control hunting.

10 Claims, 7 Drawing Sheets

TRACTION CONTROL SYSTEM FOR AUTOMOTIVE VEHICLE AND TRACTION CONTROL METHOD THEREFOR

BACKGROUND OF THE INVENTION

1. Field of the Invention

The present invention relates generally to a traction control system for an automotive vehicle in which both deceleration slip braking system (so called, ABS control) and acceleration slip braking system (so called, TCS control) are mounted.

2. Description of the Background Art

A Japanese Patent Application First Publication No. Heisei 1-301420 published on Dec. 5, 1989 exemplifies a previously proposed traction control system in which both deceleration slip brake control system (anti-lock brake controlling (ABS control) means and acceleration slip brake controlling system (brake controlling means from among driving force controlling means) are mounted.

In the previously proposed traction control system, when a switching operation between the deceleration brake control system and acceleration slip brake control system in both systems of which a brake control actuator is commonly used is carried out with the same tire wheel speed information being served as a control information, an initial control condition after the switching operation is set according to a controlled state before the switching operation.

Then, in the previously proposed traction control system disclosed in the Japanese Patent Application Publication identified above, in a case where the request of operation for the acceleration slip brake control during the deceleration slip brake control is issued, the acceleration slip brake control is immediately switched to the deceleration slip brake control. In a similar case where the request of operation for the deceleration slip brake control during the acceleration slip brake control is issued, the deceleration slip brake control is immediately switched to the acceleration slip brake control.

In this way, due to the same switching control of the switching operation, a control hunting (interference) is generated due to repetition of both the deceleration slip control and acceleration slip control.

Particularly, a braking performance is reduced, mainly caused by the deceleration slip brake control.

For example, suppose a case where the braking operation is carried out during the run on a low friction coefficient road surface and the switching is made from the acceleration slip brake control to the deceleration slip brake control.

As shown in FIG. 9, when rotation speeds of non-driven tire wheels are reduced due to the control of deceleration slip, the traction control system erroneously determines that a difference in speed between the non-driven tire wheels and driven tire wheels is generated due to the acceleration slip so that the switching from the deceleration slip control to the acceleration slip control is immediately carried out. Thereafter, when the traction control system determines that the deceleration slip occurs during the acceleration slip brake control, both brake controls are sequentially repeated such as to be switched to the deceleration slip brake control.

In addition, for example, in a case where the request of operation to start the deceleration slip brake control is issued only for one of the right and left front tire wheels, the acceleration slip brake control is immediately halted and is switched to the deceleration slip brake control. At this time, the vehicular stability is conversely reduced. This result has a cause that why the operation request for the deceleration slip brake control for one of the left and right front tire wheels is issued is that the vehicle receives a disturbance on the road surface, receives a variation of tire wheel load, and/or runs on a road segment such that only one of the left and right front tire wheels runs on a low friction road.

Furthermore, in a case where the request of operation for the acceleration slip brake control is issued during the deceleration slip brake control, the previously proposed traction control system immediately switches the control to the acceleration slip brake control. Therefore, an incremental pressure from an accumulator is added to a remaining pressure in a wheel cylinder caused by the deceleration slip brake control so as to result in an excessive braking control and a generation of a deceleration feeling by a vehicular driver.

In addition, when the acceleration brake control is carried out after the switching of control, a brake remaining liquid during the deceleration slip brake control is left in a reservoir of the brake control actuator. Therefore, a sufficient pressure decrease control cannot be achieved, a tendency to result in a tire slippery rotation may occur, and consequently, a deceleration feeling by the vehicular driver may be brought out. The deceleration feeling is such that although the vehicular driver depresses an accelerator pedal to accelerate the vehicle, the vehicle does not give the acceleration feeling to the driver but, in turn, gives the driver to feel as if the vehicle were decelerated due to the slippery motion of the driven tire wheels toward which an engine torque is transmitted.

SUMMARY OF THE INVENTION

It is, therefore, a principal object of the present invention to provide an improved traction control system for an automotive vehicle in which both deceleration slip brake control system and acceleration slip brake control system are mounted and which can achieve no hunting of control at the time of switching from the acceleration slip control to the deceleration slip control and vice versa with a priority of securing the braking performance, can achieve improvement in the braking performance at the time of braking under the vehicular run on a low friction coefficient road surface or at the time of abrupt braking without reduction in the vehicular stability, and can achieve prevention of deceleration feeling caused by the excessive braking control and slippery motion of the driven tire wheels during the switching from the deceleration slip brake control to the acceleration slip brake control.

The above-described object can be achieved by providing a traction control system for an automotive vehicle, comprising: a) deceleration slip detecting means for detecting a deceleration slip for each tire wheel, the tire wheels including non-driven wheels and driven wheels and for outputting a first signal indicative of the detected deceleration slip; b) deceleration slip brake control means for providing a braking force for each tire wheel so as to suppress a tire wheel lock according to first signal output from the deceleration slip detecting means; c) acceleration slip detecting means for detecting an acceleration slip of each driven tire wheel and outputting a second signal indicative of the detected acceleration slip; d) acceleration slip brake control means for providing the braking force for each driven tire wheel so as to suppress the acceleration slip according to the second signal output from the acceleration slip detecting means; e) deceleration slip brake control operation request means for producing and outputting a deceleration slip brake control operation request signal to start the deceleration slip brake control operation on the basis of the first signal for at least one tire wheel output from the deceleration slip detecting means; and f)) first control switching means for switching the control to the deceleration slip brake control carried out by the deceleration slip control means according to a deceleration slip state of each of the driven tire wheels when the deceleration slip brake control request signal is issued during the acceleration slip brake control carried out from the acceleration slip brake control means.

The above-described object can also be achieved by providing a traction control system for an automotive vehicle, comprising: a) deceleration slip detecting means for detecting a deceleration slip for each tire wheel, the tire wheels including non-driven wheels and driven wheels and for outputting a first signal indicative of the detected deceleration slip; b) deceleration slip brake control means for providing a braking force for each tire wheel so as to suppress a tire wheel lock according to first signal output from the deceleration slip detecting means; c) acceleration slip detecting means for detecting an acceleration slip of each driven tire wheel and outputting a second signal indicative of the detected acceleration slip; d) acceleration slip brake control means for providing the braking force for each driven tire wheel so as to suppress the acceleration slip according to the second signal output from the acceleration slip detecting means; e) acceleration slip brake control operation request means for producing and outputting an acceleration slip brake control operation request signal to start the acceleration slip brake control operation on the basis of the first signal for at least one tire wheel output from the acceleration slip detecting means; and f) first control switching means for switching the control to the acceleration slip brake control carried out by the acceleration slip control means upon a completion of the deceleration slip brake control by means of the deceleration slip brake control means when the acceleration slip brake control request signal is issued during the deceleration slip brake control carried out by the deceleration slip brake control means.

The above-described object can also be achieved by providing a method for carrying out a traction control for a rear-tire-wheel driven automotive vehicle, comprising the steps of: a) detecting a deceleration slip for each tire wheel, the tire wheel including front right and left tire wheels and rear tire driven tire wheels, and outputting a first signal indicative of the detected deceleration slip; b) providing a braking force for each tire wheel so as to suppress a tire wheel lock according to the first signal output in the step a); c) detecting an acceleration slip for each rear tire wheel and outputting a second signal indicative of the detected acceleration slip; d) providing the braking force for each rear tire wheel so as to suppress the acceleration slip according to the second signal output in the step c); e) producing and outputting a deceleration slip brake control operation request signal to start the deceleration slip brake control operation on the basis of the first signal for at least one tire wheel output in the step a); and f) switching the control to the deceleration slip brake control carried out in the step e) according to a deceleration slip state of each of rear tire wheels when the deceleration slip brake control request signal is issued during the acceleration slip brake control carried out in the step d).

DESCRIPTION OF THE PREFERRED EMBODIMENT

Reference will hereinafter be made to the drawings in order to facilitate a better understanding of the present invention.

Figure 1:
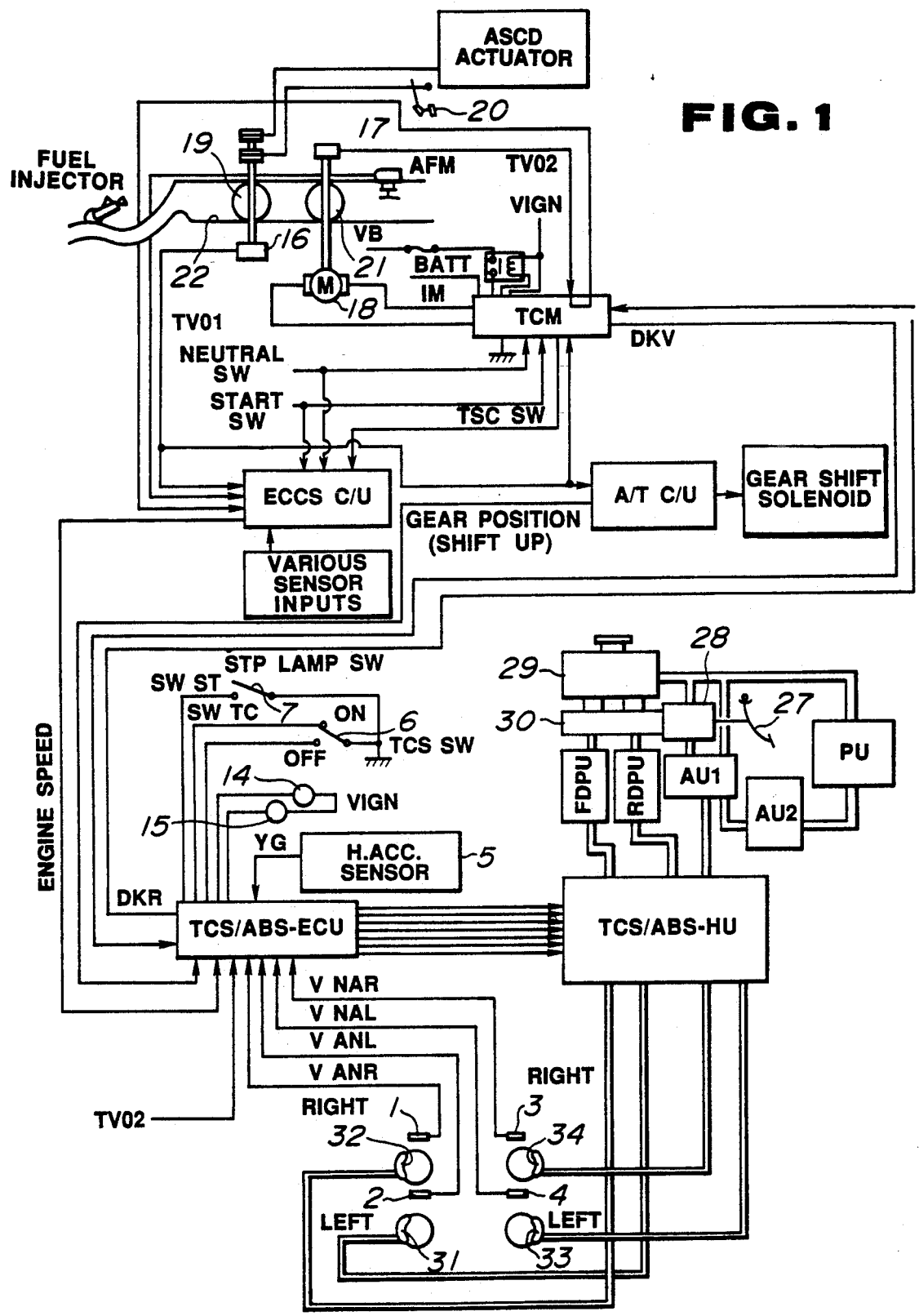
FIG. 1 is an overall view of a traction control system for a rear wheel driven automotive vehicle in a preferred embodiment according to the present invention.

FIG. 1 shows a system configuration of a traction control system in a preferred embodiment applicable to a rear-wheel driven (FR) automotive vehicle.

The rear-wheel driven vehicle shown in FIG. 1 is provided with two commonly used control systems; a throttle valve control such that an opening angle of an engine throttle valve is controlled so as to cause a value of rear tire wheel slip rate during an occurrence of acceleration slip to be fallen in an optimum allowable range; and a brake control such that a braking force is independently applied to each rear right and left tire wheel. It is noted that the brake control corresponds to an acceleration slip brake control system. In addition to these two systems, an anti-skid brake control system which carries out a front-rear tire wheel braking pressure control so as to prevent a tire wheel lock during an deceleration slip occurrence.

An electronic concentrated control for such control systems is carried out by means of a traction control system and anti-skid brake control system electronic control unit TCS/ABS-ECU (hereinafter referred simply to as TCS/ABS-ECU).

The TCS/ABS-ECU receives signals derived from various sensors; ,i.e., a) a value $V_{WFR}$ of a right front tire wheel speed sensor detected signal from a right front tire wheel speed sensor 1; b) a value $V_{WFL}$ of a left front tire wheel speed sensor detected signal from a left front tire wheel speed sensor 2; c) a value $V_{WRL}$ of a left rear tire wheel speed detected signal from a left rear tire wheel speed sensor 3; d) a lateral acceleration value YG derived from a lateral acceleration sensor 5; e) a switch signal SWTC derived from a TCS switch 6; f) a switch signal SWTC derived from a brake lamp switch 7; g) an actual opening angle value DKV of an engine throttle valve 1 derived from a throttle control module TCM (hereinafter, referred simply as to TCM); h) gear position signal and gear shift-up signal derived from an automatic transmission control unit A/T C/U (hereinafter, referred simply to as A/T C/U); i) an engine revolution speed signal derived from the electronic concentrated control unit ECCS C/U (hereinafter, referred to as ECCS C/U); and j) a second throttle value opening angle signal TV02 derived from an engine second throttle valve sensor 17.

Then, the TCS/ABS-ECU detects the acceleration slip and outputs a target opening angle 2 of the throttle valve 1 of DKR to the TCM as a throttle valve open/close signal and solenoid activation/deactivation signal as a brake increase/decrease pressure signal to each solenoid valve of a commonly used hydraulic unit TCS/ABS-HU (hereinafter, referred simply to as TCS/ABS-HU).

From among the series of traction controls described above, the throttle control side is called a TCS throttle control and the brake control side is called a TCS brake control.

In addition, the TCS/ABS-ECU detects the deceleration slip and outputs the solenoid activation/deactivation signal as the brake pressure increase/decrease signal to each solenoid of TCS/ABS-HU. The anti-skid brake control is called ABS brake control.

It is noted that from the TCS/ABS-ECU, a light turn on command is output to a TCS failure lamp 14 when the TCS has failed. During the TCS operation, a light turn on command is output to a TCS operation lamp 15.

The TCM is a control circuit with a throttle motor drive circuit as a center. The TCM inputs a first throttle signal TV01 from the first throttle sensor 16 and outputs the actual throttle 1 opening angle DKV to the TCS/ABS-ECU. The TCM inputs the second throttle signal from the second throttle signal TV02 as a feedback information to the target throttle 2 opening angle DKR and applies the motor drive current IM to the throttle motor 18 on the basis of the throttle 2 target opening angle DKR from the TCS/ABS-ECU.

The first throttle valve 19 on which the first throttle opening angle sensor 16 is a valve interlocked with an accelerator pedal 20. The second throttle valve 21 on which the second throttle sensor 17 is installed is disposed in an engine intake air passage 22 in series with the first throttle valve 19. The second throttle valve 21 is driven in response to a drive from a throttle motor 18.

The traction control system is provided with an airflow meter AFM, ECCS C/U, and a fuel injector(s) as shown in FIG. 1 as a peripheral system and the electronic concentrated control system which carries out a fuel injection quantity (timing) control, an ignition timing control, and idling revolution speed control is mounted.

When an ON signal of a traction switch signal TCS SW indicating that the traction control is continued is received, a control (select low control) such that a signal which indicates lower opening angle value is selected from both first throttle signal TV01 and second throttle signal TV02 is carried out and a canister control and EGR control are halted.

As shown in FIG. 1, the peripheral system includes an automatic transmission control system having the A/T C/U and shift solenoids and which functions to a gear shift control and lock-up control. The TCS/ABS-ECU receives the gear position signal and shift-up signal.

In addition, as shown in FIG. 1, the peripheral system includes an ASCD (automatic speed control device) actuator as an automatic cruise speed control system which is operated so as to maintain the present speed at the desired cruise speed. It is noted that, in order to prevent the control interference, when the ON signal of the traction switch signal TCS Sw is input, the open control for the first throttle valve 19 is halted upon receipt of the ON signal of the traction switch signal TCS SW and the returning speed to the closed position 1 for the first throttle valve 19 is moderate upon receipt of the OFF signal of the traction switch signal TCS SW.

It is also noted that the automatic cruise speed control system is exemplified by a U.S. Pat. No. 5,051,905 issued on Sep. 24, 1991, the disclosure of which is herein incorporated by reference.

Figure 2:
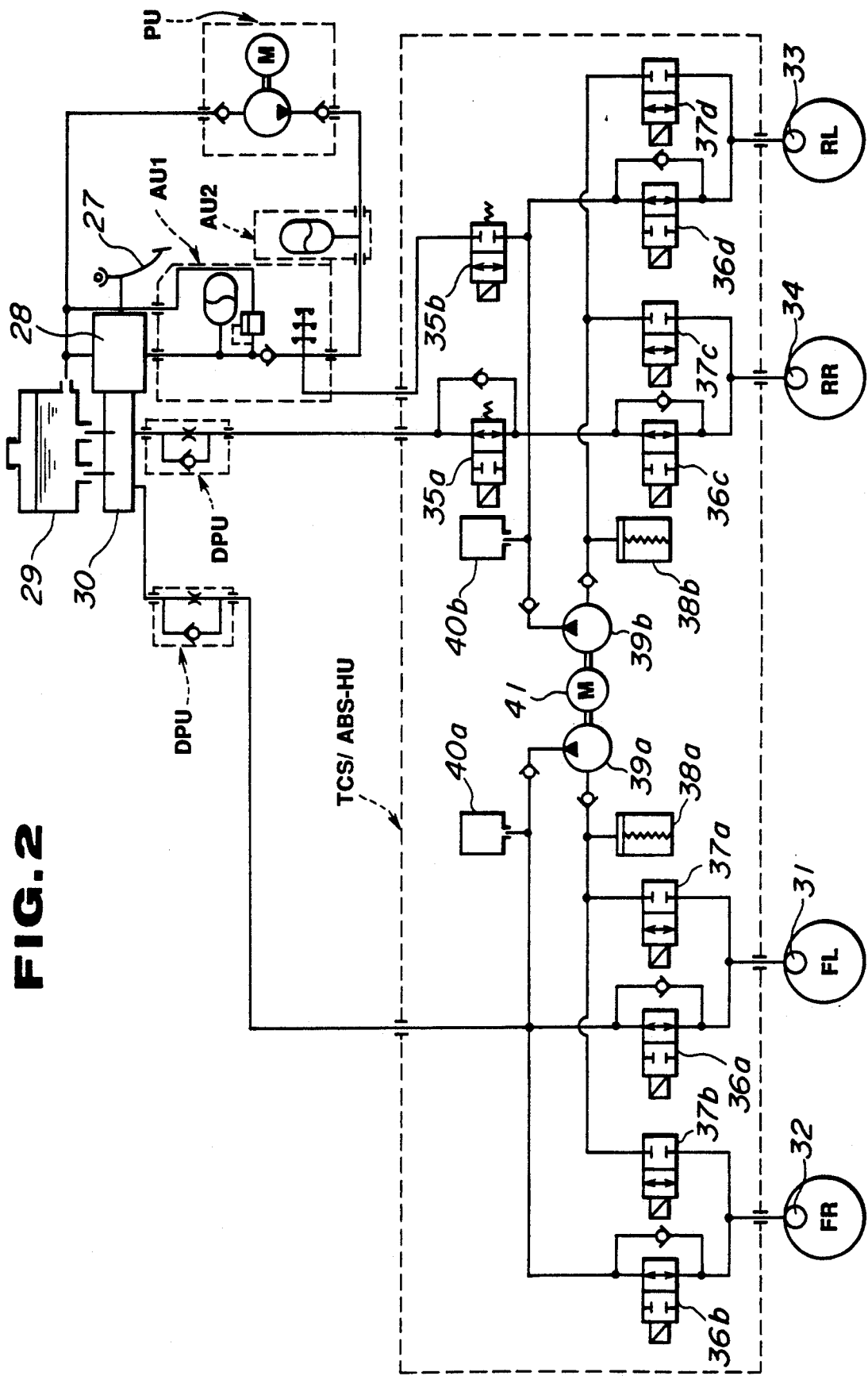
FIG. 2 is a hydraulic system configuration of the traction control system in the preferred embodiment.
Figure 3:
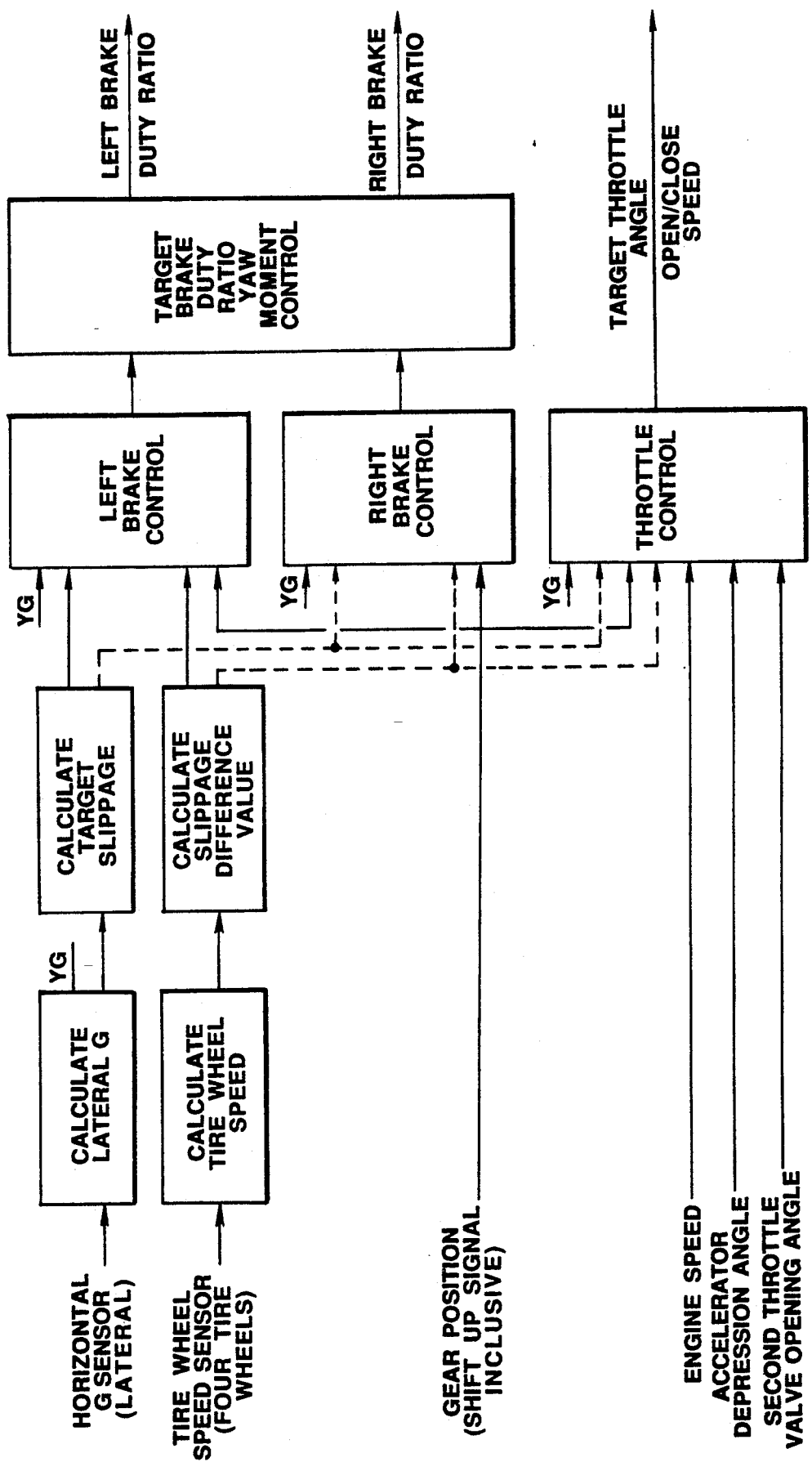
FIG. 3 is an explanatory block diagram of the traction control in the preferred embodiment shown in FIG. 1.

FIG. 2 shows a hydraulic circuit block diagram indicating a brake liquid pressure control system commonly used in the left and right rear tire wheel independent TCS brake control and ABS brake control.

It is noted that the brake liquid pressure control system is exemplified by U.S. Pat. Nos. 4,664,452 and 4,659,150, the disclosures of which are herein incorporated by reference.

The brake liquid pressure control system includes: a brake pedal 27; a hydraulic (pressure) booster 28; a master cylinder 30 having a reservoir 29: wheel cylinders 31, 32, 33, and 34; a common hydraulic unit TCS/ABS-HU; a pump unit PU; a first accumulator unit AU1; a second accumulator unit AU2; a front wheel side damping unit FDPU; and rear wheel side damping unit RDPU.

The TCS/ABS-HU includes: a first select valve 35a; a second select valve 35b; a left front wheel increase pressure valve 36b; a right front wheel increase pressure valve 36c; a right rear wheel increase pressure valve 36d; a left rear wheel decrease pressure valve 37a; a right front wheel decrease pressure valve 37b; a left rear wheel decrease pressure valve 37c; a front wheel reservoir 38a; a rear wheel side reservoir 38b; a front wheel pump 39a; a rear wheel pump 39b; a front wheel side damper chamber 40a; a rear wheel side damper chamber 40b; and a pump motor 41.

Then, when either a normal brake or ABS brake control occurs, both select valves 35a, 35b are switched to the OFF position as shown in FIG. 2 so as to introduce the liquid pressure derived from the master cylinder 30. When the TCS brake control occurs, both select valves 35a, 35b are switched to the ON position so as to introduce the liquid pressure from the second accumulator unit AU2. For example, during a pressure increase mode in the TCS brake control, each of the control valves 36c, 36d, 37c, and 37d is switched to the OFF position as shown in FIG. 2. During a hold mode in the TCS brake control, only the pressure increase valves 36c, 36d are switched to the ON positions. During a pressure decrease mode, the brake liquid is accumulated in the rear wheel side reservoir 38b and is returned to the rear wheel side damper chamber 40b due to the rotation of the rear wheel side pump 39b.

The first accumulator unit AU1 serves as a hydraulic pressure source of a hydraulic pressure booster 28. The second accumulator unit AU2 serves as a hydraulic pressure source of the TCS brake control. In both units AU1 and AU2, a common pump unit PU which sucks the brake liquid from the reservoir 29 maintains a predetermined accumulator pressure.

The front wheel side damping unit FDPU and rear wheel side damping unit RDPU, to improve a pedal feeling, serve to prevent the effect of change in the liquid pressure in the commonly used hydraulic unit TCS/ABS-HU from being given to the master cylinder 30.

Next, an operation of the traction control system in the preferred embodiment will be described below.

Figure 4:
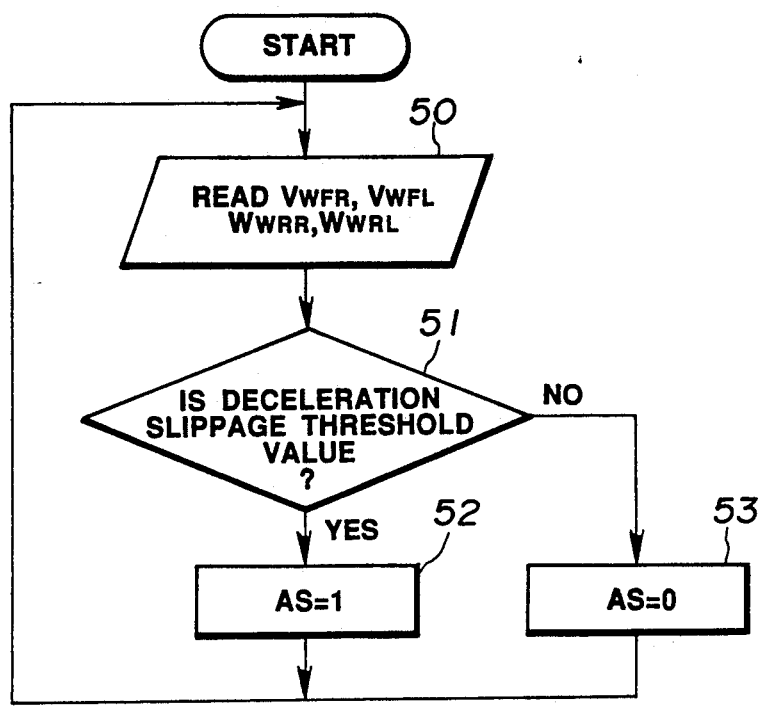
FIG. 4 is an operational flowchart indicating a series of operations of processing the output signal of ABS control brake control executed in the TCS & ABS electronic control unit in the preferred embodiment shown in FIG. 1.

(A) Traction control operation:

FIG. 4 shows a control block diagram representing a general concept of the traction control carried out by the TCS/ABS-ECU.

The traction control logic is roughly divided into four kinds of controls.

1) Calculation of an actual slip condition:

A filter processing is carried out for each of signals of tire wheel speed sensors 1, 2, 3, and 4.

On the basis of the filtered tire wheel speed values after the filter processing, the TCS/ABS-ECU carries out the calculation of the actual slip condition (slip quantity, differential value of the slip quantity).

2) Calculation of a target slip condition:

A filter processing is carried out for the signal derived from the lateral acceleration sensor 5. The TCS/ABS-ECU carries out the determination of turning/straight run according to the signal of the lateral acceleration and carries out the calculation of the target slip condition which meets the running condition.

3) The TCS brake control:

When comparing the actual slip condition with the target slip condition, the TCS/ABS-ECU carries out a required throttle opening angle and speed of the opening/closing the throttle valve (control duty ratio) and output the calculated result to TCS/ABS-HU.

4) TCS throttle control:

When comparing the actual slip condition with the target slip condition, the required throttle opening angle and speed of the open/close are calculated to output the TCM.

The feature of the control logic of the TCS throttle control is that in order to achieve an active stability securing a limit detection characteristic (steering force, squeal sound, and so on) based on a basic chassis performance according to each road surface condition from a low $\mu$ to a high $\mu$, the TCS/ABS-ECU determines divided functions of an allowable slip condition and throttle brake control according to the magnitude of the lateral acceleration.

In addition, in order to secure the stability of gear change and improve a controllability at each gear position, the throttle brake control is carried out according to the position of the gear range.

Furthermore, in order to achieve a smooth acceleration feeling and controllability suppressing a slip hunting and in order to achieve a responsive engine torque increase/decrease control, an optimum throttle control is carried out according to the engine revolution speed.

b) ABS brake control action:

When the deceleration slip of each tire wheel exceeds a deceleration slip during the braking, the solenoid signal as the brake pressure increase/decrease signal for each tire wheel independently during the braking, the solenoid signal as the brake increase/decrease pressure signal is output to each solenoid valve of the TCS/ABS-HU.

Such a control as described above causes the tire wheel lock to be suppressed in a case where the brake force becomes excessive and the tire wheel lock is accordingly about to occur such as cases where the low friction coefficient road braking and abrupt braking occur. Thus, the braking stability and shortening of the braking distance occur.

c) Output processing of brake control operation request:

FIG. 4 is an operational flowchart indicating a flow of output processing of a ABS brake control operation request carried out by means of the TCS/ABS-ECU.

In a step 50, the TCS/ABS-ECU reads the right front wheel tire wheel speed sensor value $V_{WFR}$, the right front tire wheel sensor value $V_{WFL}$, the left front tire wheel sensor value $V_{WRR}$, and the left rear tire wheel sensor value $V_{WRL}$.

In a step 51, the TCS/ABS-ECU determines whether the deceleration slip quantity calculated on the basis of the tire wheel speed signal read exceeds a deceleration slip threshold value.

If YES in the step 51 (Yes for at least one tire wheel), the routine goes to a step 52. As the operation request signal of ABS brake control, AS=1 is output. If NO in the step 51, the routine goes to the step 53. In the step 53, AS=0 is output as the ABS brake control non-operation signal.

Figure 5:
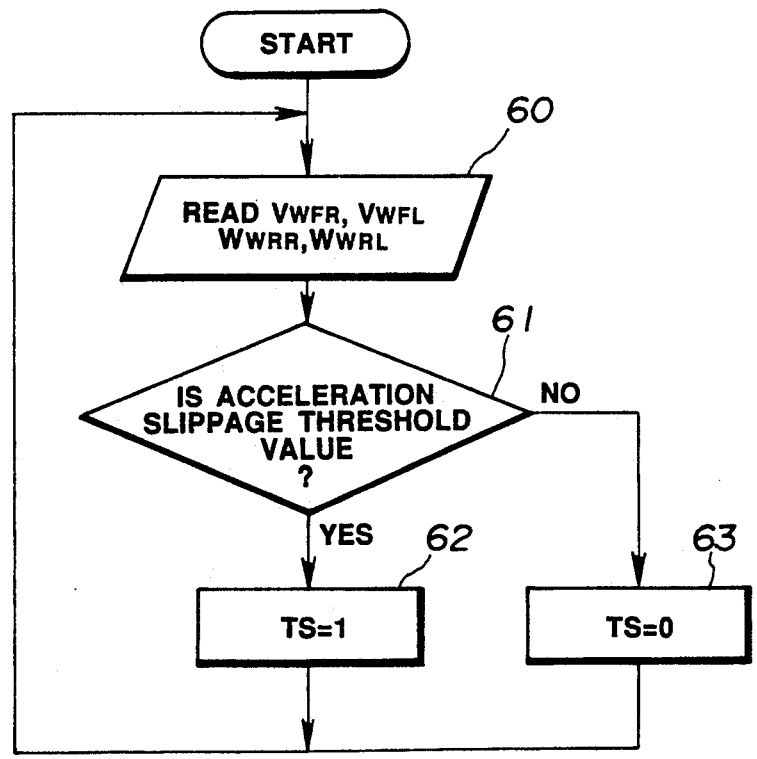
FIG. 5 is an operational flowchart indicating a series of operations of processing the output signal of TCS control brake control executed in the TCS & ABS electronic control unit in the preferred embodiment shown in FIG. 1.

FIG. 5 shows a flowchart of operation processing on the TCS brake control operation request carried out by the TCS/ABS-ECU.

In a step 60, the TCS/ABS-ECU reads the right front tire wheel speed sensor value $V_{WFR}$, left front tire wheel speed sensor value $V_{WFL}$, right rear tire wheel speed sensor value $V_{WRR}$, left rear tire wheel speed sensor value $V_{WRL}$, and right rear tire wheel speed sensor value $V_{WRL}$.

In a step 61, the TCS/ABS-ECU determines whether the acceleration slip quantity calculated on the basis of the read tire wheel speed signal is above a threshold value.

Figure 6A:
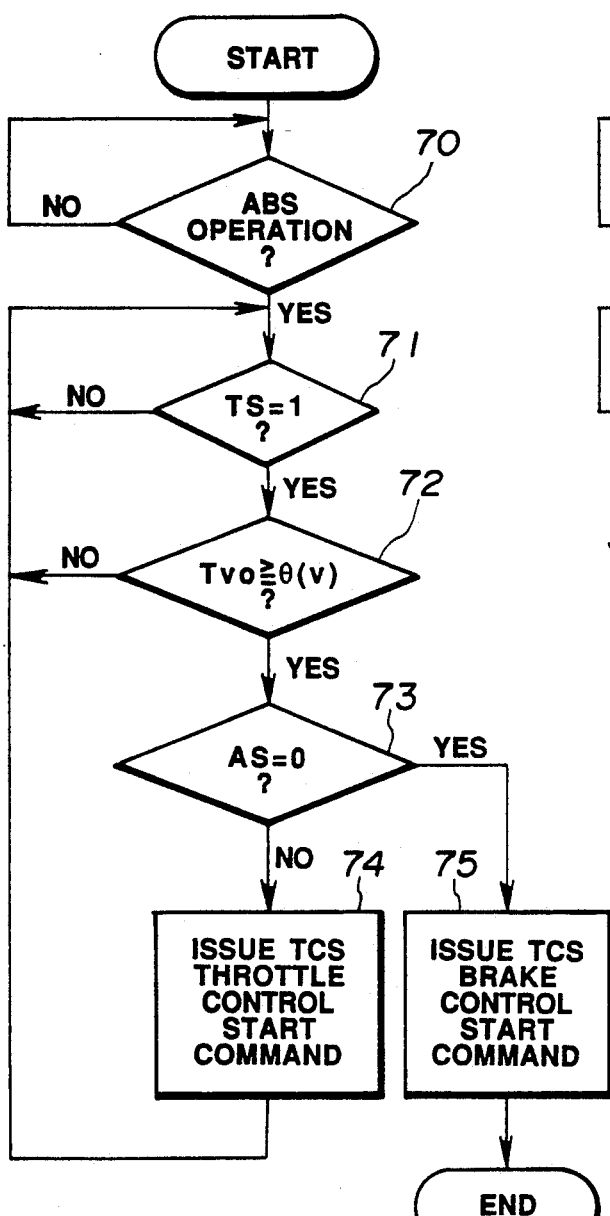
FIG. 6(A) is an operational flowchart indicating the control switching processing from ABS to TCS carried out in the electronic control unit of the preferred embodiment.

In the step 61, when the TCS/ABS-ECU determines YES at least one tire wheel, the routine goes to a step 62 in which TC=1 is output as the TCS brake control operation request signal. If NO in the step 61, the routine goes to a step 63 in which TS=0 is output as the TCS brake control non-operation signal.

d) ABS→TCS control switching action:

FIG. 6(A) is an operational flowchart of output processing of ABS→TCS carried out in the TCS/ABS-ECU.

In a step 70, the TCS/ABS-ECU determines whether the ABS brake control operation is carried out.

In a step 71, the TCS/ABS-ECU determines whether the TCS brake operation request signal TS=1 is output.

In a step 72, the TCS/ABS-ECU determines whether the throttle opening angle TV0 is above the vehicle speed corresponding throttle valve calculation value $\theta(V)$.

It is noted that the throttle valve opening angle TV0 is derived so as to select a smaller value of either the first throttle opening angle value TV01 and second throttle opening angle value TV02. The TCS/ABS-ECU derives a vehicular speed corresponding calculated value $\theta(V)$, e.g., from the following calculation equation:

$\theta(V) = \alpha \cdot V_{FTF}^2 + \beta$, wherein $V_{FTF}$ front wheel speed average value.

In a step 73, the TCS/ABS-ECU determines whether the ABS brake non-operation signal AS=0 is output.

When satisfying the processes of the respective steps 70, 71, and 72, the routine goes to a step 74 in which a start command for the TCS throttle control is output.

Figure 7:
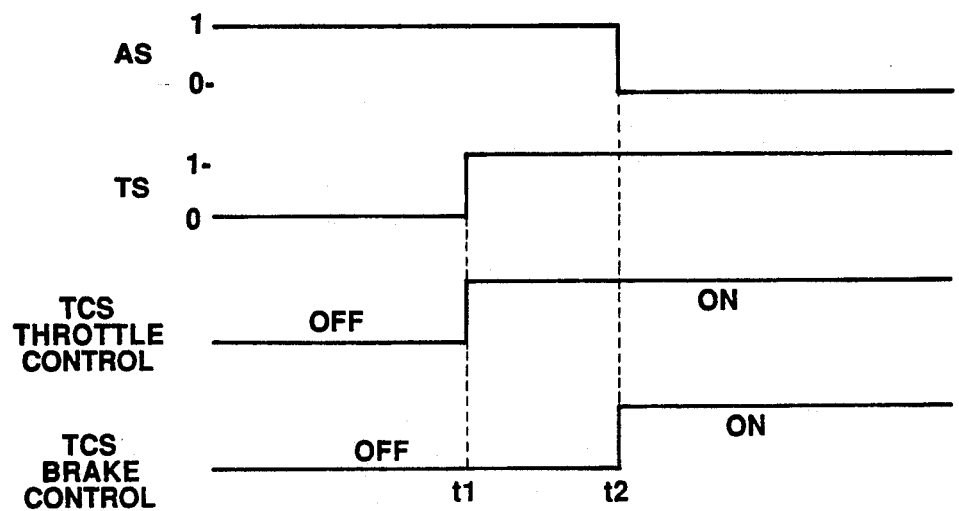
FIG. 7 is a timing chart during the switching from ABS to TCS.
Figure 8:
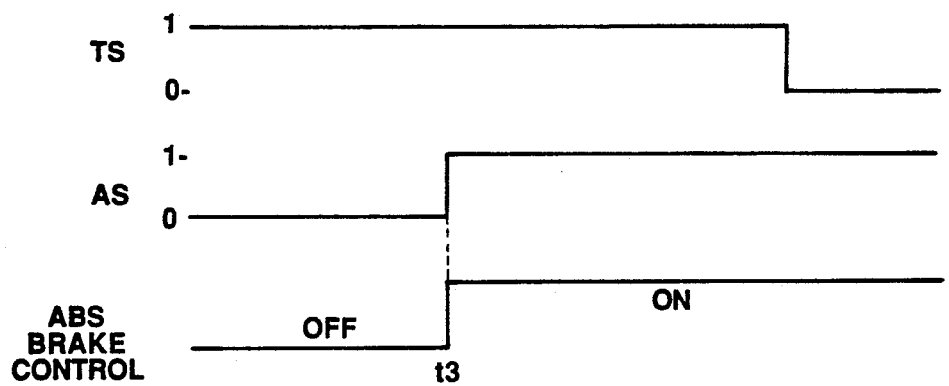
FIG. 8 is a timing chart during the switching from TCS to ABS.
Figure 9:
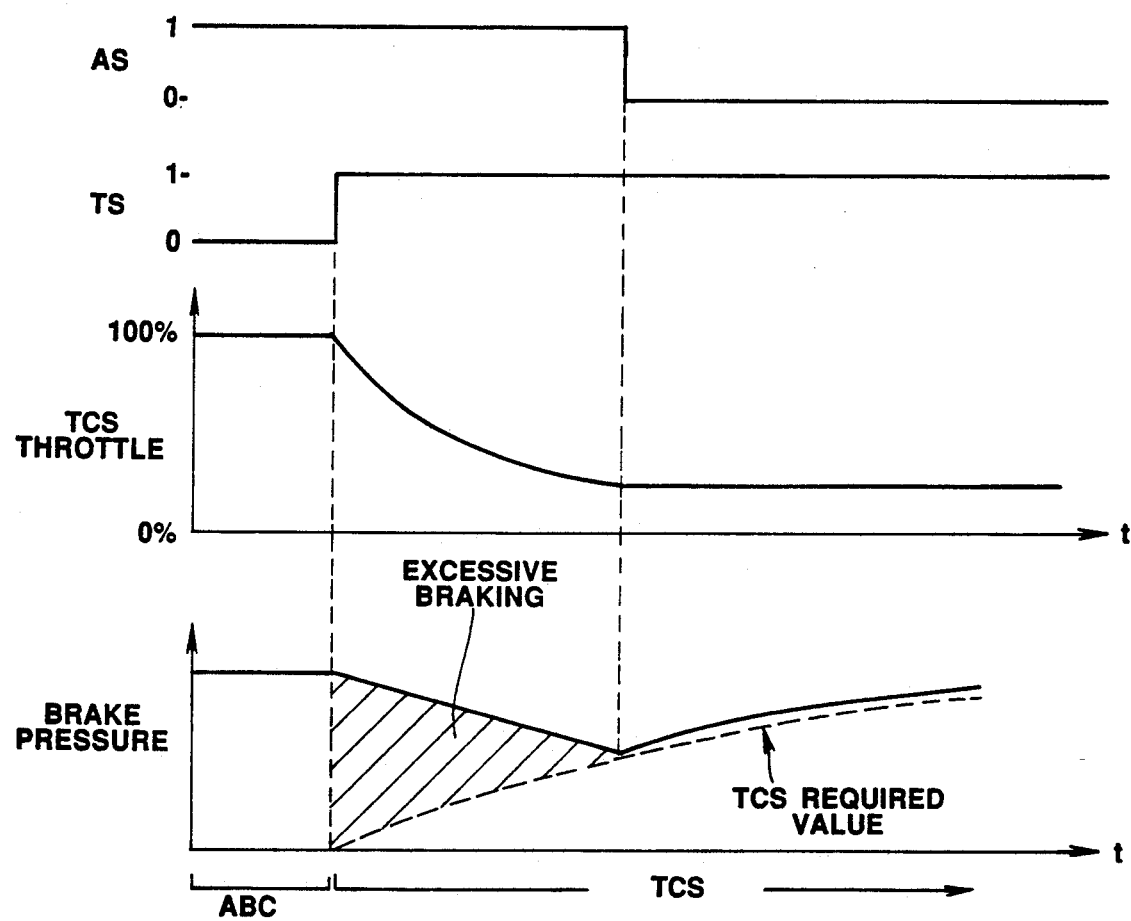
FIG. 9 is a characteristic graph of a vehicular tire wheel explaining a hunting of control between the ABS and TCS in the previously proposed traction control system described in the BACKGROUND OF THE INVENTION.

Hence, during the control switching from ABS to TCS, the TCS throttle control is started immediately at a time of $t_1$ during the ABS braking, as shown in the timing chart of FIG. 7. However, the TCS brake control is started until waiting for the time $t_2$ at which the ABS brake control is started. In this way, for the time duration from the time $t_1$ to the time $t_2$, both ABS brake control and TCS throttle control are simultaneously operated so that, at the time of $t_2$, the switching of the ABS brake control to the TCS brake control is carried out.

Suppose, for example, that in a case where the TCS brake operation request signal TS=1 is output and thereafter the ABS brake control is immediately switched to the TCS brake control. In this case, a pressure increment quantity from the accumulator is added to the wheel cylinder remaining pressure so that an excessive amount of brake control is resulted and vehicular deceleration feeling is generated. In addition, in a case where the TCS brake control is carried out, a sufficient pressure reduction control cannot be achieved since the brake remaining liquid is present in the ABS brake control within the reservoirs 38a, 38b. Therefore, an insufficient pressure reduction control cannot be achieved and the vehicular deceleration feeling are generated. This matter is already explained in the BACKGROUND OF THE INVENTION.

On the other hand, if the TCS throttle control is preceded, maintaining the ABS control during the duration of time of $t_1$ to $t_2$, a brake pressure under the ABS brake control can be reduced. Therefore, the excessive brake control is suppressed. In addition, the brake remaining liquid within the reservoirs 38a, 38b can previously be eliminated by operations of the pumps 39a, 39b due to the continuation of the ABS brake control during the time $t_1$ to the time $t_2$.

In addition, if the TCS brake control request signal TS=1 is output due to the generation of the acceleration slip, in the step 72, the ABS brake control is switched to the TCS throttle control provided that the throttle opening angle TV0 is below the calculated value $\theta(V)$ when the vehicle speed corresponding throttle value opening angle TV0 is above the vehicular speed corresponding throttle valve opening angle $\theta(V)$.

Figure 6B:
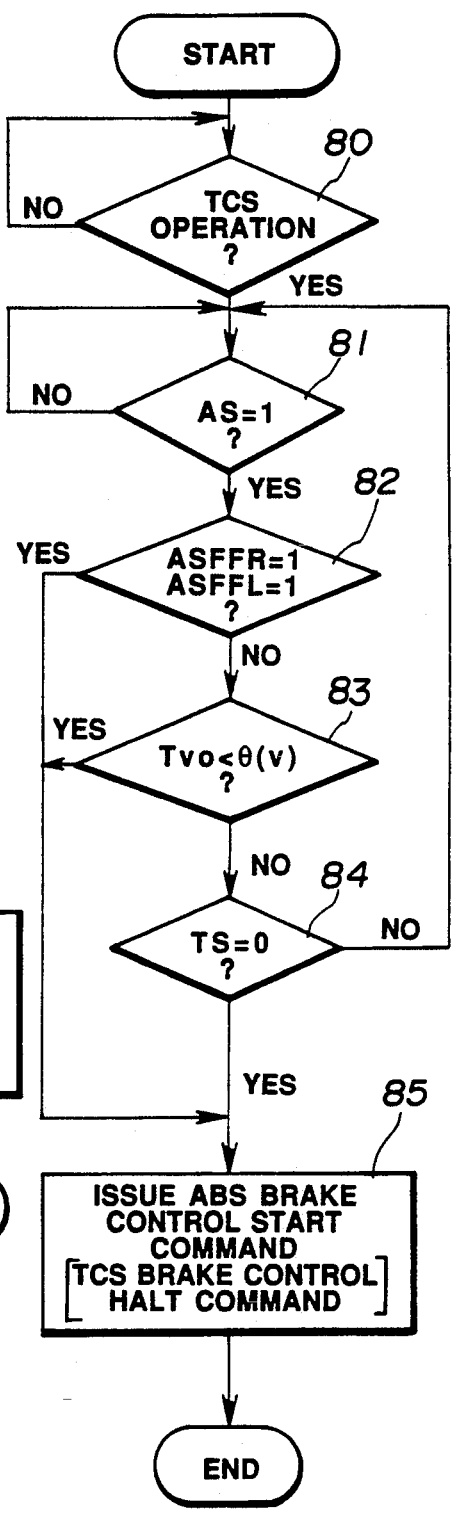
FIG. 6(B) is an operational flowchart indicating the control switching processing from TCS to ABS carried out in the electronic control unit of the preferred embodiment.

This is because if the control is immediately switched to the TCS throttle control when the throttle valve opening angle TV0 provides a relatively small value, the decrease in pressure of the braking pressure becomes lately slippery as well as the engine braking due to an abrupt return of the second throttle valve 21 to a closed position. Thus, the excessive pressure decrease feeling is generated and the rear tire wheel tends to be locked and stability is reduced. In addition, the reason of using the vehicular speed corresponding throttle opening calculated value $\theta(V)$ is that it provides the present running resistance based on a sum of air resistance ($\alpha \cdot V_{FEF}^2$) proportional to a square of the vehicle speed $V_{FTF}$ and rolling resistance $\beta$. As the running resistance becomes large, the larger calculated value $\theta(V)$ is a reference value.

e) TCS→ABS control switching action:

FIG. 6(B) is an operational flowchart for processing the control switching action from the TCS control to the ABS control carried out in the TCS/ABS-ECU.

In a step 80, the TCS/ABS-ECU determines whether the present time is under the TCS brake control operation.

In a step 81, the TCS/ABS-ECU determines whether it is a time when the ABS brake control operation request signal AS=1 is output.

In a step 82, the TCS/ABS-ECU determines whether both ABS brake control operation request signal $AS_{FFR}=1$ for the right front tire wheel and ABS brake control operation request signal $AS_{FFC}$ for the left front tire wheel are simultaneously output.

In a step 83, the TCS/ABS-ECU determines whether the throttle opening angle TV0 is less than the vehicular speed corresponding throttle opening angle calculated value $\theta(V)$.

In a step 84, the TCS/ABS-ECU determines whether it is the time when the TCS brake non-operation signal TS=0 is output.

When any one of routines of the steps 80, 81, and 82 or of steps 80, 81, and 83, of steps 80, 81, and 84 is satisfied, the routine goes to a step 85 in which a start command to carry out the ABS throttle control is output. It is noted that when the routine goes from either step 82 or step 85 to the step 85, a halt command to halt the TCS brake control is output in addition to the output of the start command for the ABS throttle control.

Hence, at the time of the switching from the TCS to the ABS, the ABS brake control is started immediately when the ABS brake control operation request signal AS=1 is output at the time of $t_3$ during the TCS brake control operation in cases where the ABS brake operation request conditions for both right and left front tire wheels.

As described above, the reason of selecting the switching condition that the operation requests for the front tire wheels as non-driven wheels is that for the non-driven tire wheels the ABS operation requests are accurate or preceded as compared with for the driven tire wheels. In addition, the reason of selecting the switching condition for the left and right front tire wheels is that, for example, when both the right and left front tire wheels are under the braking operations on a low $\mu$ road surface condition on which both right and left front tire wheels are susceptible to be slipped, it is preferable to having a higher priority of the ABS control than the TCS. Furthermore, in a case where the ABS operation request is issued for one of the right and left front tire wheels, the ABS operation request is generated for one of either right and left front tire wheel due to a road surface disturbance, variation in a tire wheel load, a road run over a projection, or split $\mu$ road. In this case, if the TSC control is immediately halted, the vehicular stability will, in turn, often be deteriorated.

In addition, of the ABS operation request is issued during the TCS control, the control is switched to the ABS control is either the throttle opening angle condition in the step 83 or output condition that the TCS brake control non-operation signal TS=0 is output is satisfied.

Next, the effects achieved by the TCS/ABS-ECU control unit described above will be described below.

1) A control hunting can be prevented between the ASB brake control and TCS brake control with a priority of securing the braking performance since this system determines that the switching condition from the ABS brake control to the TCS brake control is an end of the ABS brake control, the switching condition from the TCS brake control to the ABS brake control is the ABS operation request for both left and right front tire wheels, and the ABS brake control is, at this time, provided with a higher priority.

2) The improvement of the braking performance can be achieved at the time of braking on a low friction coefficient road surface and/or abrupt braking without sacrifice of vehicular stability since the immediate ABS brake control is started in a case where the ABS brake control operation request is issued for both right and left front tire wheels when the control is switched from the TCS to the ABS control.

3) The generation of vehicular deceleration feeling due to the excessive brake control or deceleration feeling due to slippery brake can be prevented since the TCS throttle control is immediately carried out and the TCS brake control is carried out upon end of the ABS brake control when the control is switched from the ABS to the TCS control.

4) The generation of an excessive pressure decrease feeling or tendency of rear tire wheel locks can be prevented and the vehicular stability can be prevented since the control enters the TCS control provided that the opening angle of the first throttle valve TVO is above the vehicular speed corresponding throttle opening angle calculated value $\theta V$) in a case where the TCS brake control operation request signal TS=1 is output due to the generation of the acceleration slip.

It is noted that although, in the preferred embodiment, the present invention is applicable to the traction control system for the throttle valve and for the brake system, the present invention is also applicable to the traction control system for only brake system.

As described hereinabove, since, in the traction control system according to the Applicant's invention in which both the deceleration slip brake control system and acceleration slip control system are mounted, the switching condition under which the control is switched from the deceleration slip brake control to the acceleration slip brake control is different from that under which the control is switched from the acceleration slip brake control to the deceleration slip brake control, the deceleration slip brake control set to have a higher priority, the braking performance is assured and the control hunting can be prevented between the deceleration and acceleration slip brake control.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A traction control system for an automotive vehicle, comprising:

(a) deceleration slip detecting means for detecting a deceleration slip for each tire wheel, the tire wheels including non-driven wheels and driven wheels and for outputting a first signal indicative of the detected deceleration slip;

b) deceleration slip brake control means for providing a braking force for each tire wheel so as to suppress a tire wheel lock according to first signal output from the deceleration slip detecting means;

(c) acceleration slip detecting means for detecting an acceleration slip of each driven tire wheel and outputting a second signal indicative of the detected acceleration slip;

(d) acceleration slip brake control means for providing the braking force for each driven tire wheel so as to suppress the acceleration slip according to the second signal output from the acceleration slip detecting means;

e) deceleration slip brake control operation request means for producing and outputting a deceleration slip brake control operation request signal to start the deceleration slip brake control operation on the basis of the first signal for at least one tire wheel output from the deceleration slip detecting means; and f) first control switching means for switching the control to the deceleration slip brake control carried out by the deceleration slip control means according to a deceleration slip state of each of the driven tire wheels when the deceleration slip brake control request signal is issued during the acceleration slip brake control carried out from the acceleration slip brake control means.

2. A traction control system for an automotive vehicle as set forth in claim 1, which further includes:

g) acceleration slip brake control operation request means for producing and outputting an acceleration slip brake control operation request signal to start the acceleration slip brake control on the basis of the second signal output from the acceleration slip detecting means; and h) second control switching means for switching the control to the acceleration slip brake control carried out by the acceleration slip brake control upon completion of the deceleration slip brake control when the acceleration slip brake control operation request signal is issued.

3. A traction control system for an automotive vehicle as set forth in claim 2, wherein said first control switching means includes first predetermined condition setting means for establishing a first predetermined condition for the control to be switched to the deceleration slip brake control and said first control switching means switches the control to the deceleration slip brake control after the first predetermined condition is satisfied when the deceleration slip brake control operation request signal is issued during the acceleration slip brake control operation.

4. A traction control system for an automotive vehicle as set forth in claim 3, wherein said second control switching means includes second predetermined condition setting means for establishing a second predetermined condition for the control to be switched to the acceleration slip brake control and said second control switching means switched the control to the acceleration slip brake control after the second predetermined condition is satisfied when the acceleration slip control operation request signal is issued during the deceleration slip brake control operation said first predetermined condition being more moderate than said second predetermined condition.

5. A traction control system for an automotive vehicle as set forth in claim 4, wherein said first predetermined condition is a deceleration slip condition of each of or either of the non-driven tire wheels and said second predetermined condition is a completion of the deceleration slip brake control.

6. A traction control system for an automotive vehicle as set forth in claim 5, wherein said acceleration slip brake control means includes engine output control means for controlling an engine output of the automotive vehicle and wherein said acceleration slip brake control means carries out the acceleration slip brake control when the deceleration slip brake control operation request signal is issued.

7. A traction control system for an automotive vehicle, comprising:
 a) deceleration slip detecting means for detecting a deceleration slip for each tire wheel, the tire wheels including non-driven wheels and driven wheels and for outputting a first signal indicative of the detected deceleration slip;
 b) deceleration slip brake control means for providing a braking force for each tire wheel so as to suppress a tire wheel lock according to first signal output from the deceleration slip detecting means;
 c) acceleration slip detecting means for detecting an acceleration slip of each driven tire wheel and outputting a second signal indicative of the detected acceleration slip;
 d) acceleration slip brake control means for providing the braking force for each driven tire wheel so as to suppress the acceleration slip according to the second signal output from the acceleration slip detecting means;
 e) acceleration slip brake control operation request means for producing and outputting an acceleration slip brake control operation request signal to start the acceleration slip brake control operation on the basis of the first signal for at least one tire wheel output from the acceleration slip detecting means;
 f) first control switching means for switching the control to the acceleration slip brake control carried out by the acceleration slip control means upon a completion of the deceleration slip brake control by means of the deceleration slip brake control means when the acceleration slip brake control request signal is issued during the deceleration slip brake control carried out by the deceleration slip brake control means.

8. A traction control system for an automotive vehicle as set forth in claim 7, which further includes:
 g) deceleration slip brake control operation request means for producing and outputting a deceleration slip brake control operation request signal to start the deceleration slip brake control on the basis of the first signal output from the deceleration slip detecting means; and
 h) second control switching means for switching the control to the deceleration slip brake control carried out by the deceleration slip brake control upon completion of the acceleration slip brake control when the deceleration slip brake control operation request signal is issued.

9. A traction control system for an automotive vehicle as set forth in claim 8, wherein said first and second switching means includes a common TCS/ABS-ECU.

10. A method for carrying out a traction control for a rear-tire-wheel driven automotive vehicle, comprising the step of:
 a) detecting a deceleration slip for each tire wheel, the tire wheel including front right and left tire wheels and rear tire driven tire wheels, and outputting a first signal indicative of the detected deceleration slip;
 b) providing a braking force for each tire wheel so as to suppress a tire wheel lock according to the first signal output in the step a);
 c) detecting an acceleration slip for each rear tire wheel and outputting a second signal indicative of the detected acceleration slip;
 d) providing the braking force for each rear tire wheel so as to suppress the acceleration slip according to the second signal output in the step c);
 e) producing and outputting a deceleration slip brake control operation request signal to start the deceleration slip brake control operation on the basis of the first signal for at least one tire wheel output in the step a); and
 f) switching the control to the deceleration slip brake control carried out in the step e) according to a deceleration slip state of each of rear tire wheels when the deceleration slip brake control request signal is issued during the acceleration slip brake control carried out in the step d).

* * * * *